United States Patent [19]

Mizuhara

[11] Patent Number: 4,799,532

[45] Date of Patent: Jan. 24, 1989

[54] METHOD OF MAKING A CRUCIBLE AND MELTING REACTIVE METAL ALLOYS

[75] Inventor: Howard Mizuhara, Hillsborough, Calif.

[73] Assignee: GTE Products Corporation, Stamford, Conn.

[21] Appl. No.: 122,968

[22] Filed: Nov. 19, 1987

Related U.S. Application Data

[62] Division of Ser. No. 834,727, Feb. 28, 1986, Pat. No. 4,723,764.

[51] Int. Cl.⁴ ................................................ B22D 7/06

[52] U.S. Cl. ...................................... 164/47; 164/335; 420/590

[58] Field of Search ................... 164/23, 519, 72, 138, 164/14, 47, 335; 266/275, 280, 283, 284, 286; 501/133; 420/502, 497, 495, 590; 264/86, 219; 249/134

[56] References Cited

U.S. PATENT DOCUMENTS

| | | | |
|---|---|---|---|
| 3,734,480 | 5/1973 | Zanis et al. | 266/275 |
| 3,993,844 | 11/1976 | Kiger et al. | 501/64 |
| 4,033,780 | 7/1977 | Baumgartner et al. | 501/133 |
| 4,047,966 | 9/1977 | Bihuniak et al. | 501/133 |

FOREIGN PATENT DOCUMENTS

| | | | |
|---|---|---|---|
| 45-28108 | 9/1970 | Japan | 420/502 |
| 1208721 | 10/1970 | United Kingdom | 420/502 |

*Primary Examiner*—Deborah Yee

*Attorney, Agent, or Firm*—James Theodosopoulos

[57] ABSTRACT

A crucible for melting metals therein to form an active brazing alloy is made of slip cast silica with an yttria lining on the inside surface thereof.

4 Claims, No Drawings

METHOD OF MAKING A CRUCIBLE AND MELTING REACTIVE METAL ALLOYS

This application is a division, of application Ser. No. 834,727, filed 2/28/86, now U.S. Pat. No. 4,723,764.

This invention concerns crucibles used for melting metal alloys, especially brazing alloys containing an active metal such as titanium or zirconium. Although water-cooled metal crucibles, for example, copper crucibles, are satisfactory for some alloys, they are not satisfactory where accurate composition control is desired, the reason being that a layer of unmelted metal adheres to the walls of the metal crucible.

I have found that a crucible made of a ceramic material will not have the problem of melted metal adhering to the walls. But for brazing alloys containing an active metal and a precious metal, such as silver, I have found that there is an optimum ceramic crucible The crucible is made of fused silica with a lining of yttria. The yttria lining is inert to the active metal and prevents the active metal from reacting with the silica. The silica readily lends itself to reclamation of any precious metal that remains in the crucible because silicious material is a major additive used in the pyrolytic extraction of precious metal.

Evaluation of pick up of crucible material was carried out by melting a 72% silver-28% copper alloy with 2 to 3% titanium in various ceramic crucibles. The crucible dimension used for the evaluation was about 3" outside diameter by 2½" inside diameter by about 7" tall. The crucible comprised a closed bottom, walls having an interior surface, and an open top through which metals can be entered for the purpose of being melted and alloyed within the crucible. The crucible was placed inside an insulated high frequency induction coil and 24 grams of titanium were placed in the bottom followed by 776 grams of 72% silver–28% copper..alloy placed thereover. The metal was melted over a 30 minute period to about 875o to 1000° C., held thereat for 10 minutes and then cast into a copper mold. The cast alloy was then tested for crucible material pick up. This procedure was used to evaluate the following crucibles.

A crucible was slip cast of 99.8% alumina, lined with yttria in the green state, and then fired at 1700° C. for 3 hours. The lining was dense and the crucible looked monolithic. However, it cracked during heating.

A silicon nitride crucible was slip cast, then sintered at 1750° C. in a nitrogen atmosphere for 2 hours. The crucible cracked on first use. Analysis of the silver-copper-titanium alloy showed silicon pickup.

A slip cast 99.8% alumina crucible was sintered at 1700° C. for 3 hours. The crucible cracked on first heat up. Analysis of the silver-copper-titanium alloy showed aluminum pickup.

A graphite crucible was machined from a graphite slug. The crucible stood up to repeated melting but carbon was picked up by the silver-copper-titanium alloy to the extent of 60 parts per million.

A graphite crucible was coated with yttria. The yttria lining showed weak adhesion to the graphite, which resulted in carbon pick up by the silver-copper-titanium alloy.

My invention uses a fused silica crucible lined with yttria. Fused silica is inexpensive, is easily slip cast and, on drying, possess strong green strength because of the partial hydrolysis of fine amorphous silica.

A major consideration in melting precious metal is to be able to extract any precious metal that may adhere to the crucible. Silicious material is ideally suited as a crucible material because silica is one of the major additives used in the pyrolytic extraction of precious metal.

Slip cast fused silica sets hard on drying and will not fall apart when wet with water. This makes it especially suitable for casting a lining on the inside of a crucible made thereof.

A fused silica slip was prepared by milling 670 grams of −40M fused silica cullet, finer than 40 mesh, for 18 hours at 60 rpm in a 1⅓ gallon mill charged with 1" round alumina media to about 65% of mill volume.

The slip was poured into a plaster of paris mold and additional slip was poured into the mold to maintain slip level until ¼" wall thickness was reached. The slip was then poured out and the crucible allowed to stand in the mold overnight. The crucible was then removed from the mold and allowed to air dry. Air dried crucibles were then coated with the following compositions.

EXAMPLE 1

25 grams powdered yttria
25 grams water
10 grams Ludox (an aqueous colloidal sol containing appx. 30% $SiO_2$ made by E.I. Dupont Co.)
1 gram Phthalo green (a dye made by Chemtron Corp.)
1 gram Triton X-100 (a dispersant made by Union Oil Co.)

These materials were milled for 16 hours in a one quartz ceramic mill charged with ½" rod alumina milling media to about 65 volume percent. The mill was then opened and one drop of octyl alcohol (to eliminate foam) was added and remilled for a few minutes. The yttria slurry was then poured into air dried crucible and then immediately discharged therefrom while rotating the crucible to apply a thin uniform coating on the inner surface of the crucible. The purpose of the dye is to make the coating visible in the green state. It is burned off upon sintering. The crucible was then air dried in an inverted position. However, the yttria coating showed peeling near the crucible lip.

EXAMPLE 2

25 grams powdered yttria
50 grams water
10 grams Ludox
1 gram Phthalo green
1 gram Triton X-100

The same procedure was followed as in Example 1. This composition resulted in a smooth uniform coating about 1/64" thick on the inner surface of the crucible. Sintering the crucible for 2 hours at 1200° C. resulted in a monolithic crucible. This yttria-lined crucible can be used to prepare about five brazing alloy melts before the crucible shows signs of wear.

The coating composition of Example 2 provided the most satisfactory results. The use of silicious, materials other than colloidal silica, for example, ethyl silicate, did not provide a thin, uniform, adherent, dense yttria coating. Also, too much of the colloidal silica resulted in a hard coating which was not smooth and which flaked off, while too little silica resulted in insufficient binding, i.e., not enough green strength. The composition of 25 grams yttria to 10 grams of Ludox which equals approximately a ratio of 25 to 3 yttria to colloidal silica did not suffer these drawbacks.

I claim:

1. The method of making an active brazing alloy comprising the steps of forming a crucible of slip cast fused silica, coating the interior of the crucible with an yttria lining, firing ,the yttria-lined crucible, entering metals into the crucible, and-heating the metals to cause them to melt and form the alloy.

2. The method of claim 1 including the steps of pouring a slurry of fused silica into a plaster of paris mold to form a build up of silica on the mold in the shape of a crucible, air drying the silica crucible, pouring a slurry of yttria into the crucible to form an yttria lining on the inside of the crucible, and sintering the yttria-lined crucible at a high temperature to produce a monolithic crucible.

3. The method of claim 2 including the steps of milling fused silica in water to prepare a fused silica slip, pouring the slip into a plaster of paris mold and maintaining slip level in the mold until a silica wall thickness of about 1/4" is formed on the mold in the shape of a crucible, pouring the slip out of the mold, allowing the silica to air dry, pouring into the silica crucible a slurry comprising yttria, water and a dispersant and immediately discharging the slurry therefrom while rotating the crucible to apply a thin uniform yttria coating on the crucible.

4. The method of claim 1 including the steps of adding silver, copper and titanium to the fired yttria-lined crucible, heating and melting the silver, copper and titanium to form an alloy thereof, and then pouring the liquid alloy into a mold to form a casting thereof.

* * * * *